United States Patent [19]

Apple

[11] Patent Number: 4,635,875
[45] Date of Patent: Jan. 13, 1987

[54] CABLE PULLING DEVICE

[76] Inventor: Merrill K. Apple, 863 Linden La., Davis, Calif. 95616

[21] Appl. No.: 572,009

[22] Filed: Jan. 19, 1984

[51] Int. Cl.⁴ .................... B65H 59/18; B65H 57/28; B66D 1/08
[52] U.S. Cl. ....................... 242/155 BW; 242/158 B; 242/158.4 R; 254/134.3 R; 254/294
[58] Field of Search ..... 242/155 BW, 158 B, 158.4 R; 254/271, 294, 340, 377, 134.3 R, 134.3 PA, 276, 281, 284, 314

[56] References Cited

U.S. PATENT DOCUMENTS

| | | | |
|---|---|---|---|
| 1,591,009 | 7/1926 | Baldwin | 242/158 R |
| 2,947,494 | 8/1960 | Merritt | 242/155 BW |
| 3,073,544 | 1/1963 | Garnett | 242/134.3 R X |
| 3,226,088 | 12/1965 | Habighorst | 254/134.3 R |
| 3,390,785 | 7/1968 | Lado | 254/340 X |
| 3,439,883 | 4/1969 | Petersen | 242/155 BW |
| 3,448,962 | 6/1969 | Miller | 254/291 |
| 3,544,070 | 12/1970 | Blume | 254/134.3 R |
| 3,836,122 | 9/1974 | Pierce | 254/340 X |
| 3,968,952 | 7/1976 | Newell | 254/134.3 R |
| 4,026,483 | 5/1977 | Skalleberg | 242/25 R |
| 4,030,569 | 6/1977 | Berkovitz | 242/155 BW X |

FOREIGN PATENT DOCUMENTS

| | | | |
|---|---|---|---|
| 2922421 | 12/1980 | Fed. Rep. of Germany | 242/271 |
| 12854 | of 1894 | United Kingdom | 242/47.09 |

OTHER PUBLICATIONS

Braden CL Winch brochure, Braden Industries, Inc.
Gear Products Planetary Winch, Gear Products, Inc.
All-Angle Ball Bearing Swivel Sheave, Holan Corp.
Morse Torque Limiter.

*Primary Examiner*—John M. Jillions
*Attorney, Agent, or Firm*—Leonard Bloom

[57] ABSTRACT

An improved cable paying out and taking up device particularly for use in underground or overhead cable pulling environments which includes a novel winch assembly disposed on a vehicle, a swivel fairlead disposed on a trailing portion of the vehicle bed adapted for facile removal and redeployment, the swivel fairlead provided with instrumentalities for operatively orienting a pulley sheave associated with the fairlead in 360° of direction and allowing disassociation of the pulley sheave from its associated support drum so that cable including an enlarged end unable to fit within clearances about the pulley sheave can be threaded through the swivel fairlead without disassociation of the cable from the enlarged end. The novel winch briefly includes a pair of winches modified to accommodate a removable bull wheel having a plurality of grooves on its outer face, the grooves dimensioned to receive cables corresponding to the diameter of the cable, an instrumentality for assuring level winding, a pressure responsive instrumentality associated with a reel to accommodate variations in effective reel diameter due to cable build-up and pay-out, so that hydraulic pressure and synchronization of the various rotating winches and reel can be coordinated for the accurate functioning of the apparatus.

9 Claims, 12 Drawing Figures

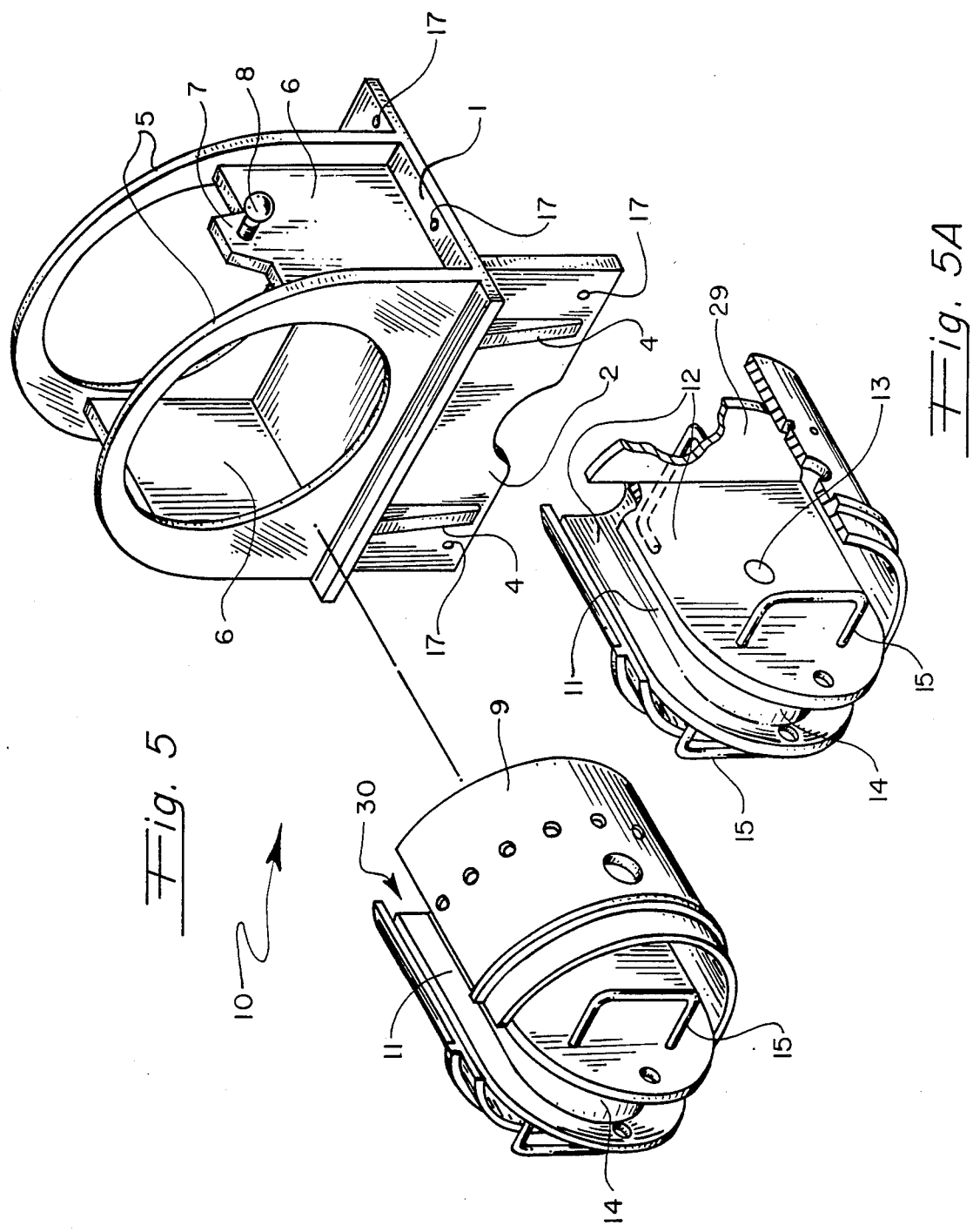

CABLE PULLING DEVICE

BACKGROUND OF THE INVENTION

The following invention relates generally to an instrumentality for pulling cable which is to be preferably installed either in an overhead or underground environment and includes replacing existing cable.

The art of pulling cable in either an underground or an overhead environment has traditionally required the use of different mechanisms since the angle of attack for each job imposed loads upon the pulling apparatus which would be too diverse for a single pulling device. Since the winch mechanism associated with the pulling instrumentality has traditionally been mechanical or hydraulic, binding of the cable or awkward angles of attack can cause nonconstant hydraulic loading to the detriment of the pulling mechanism. In addition, the cable drum upon which the cable is to be wound and unwound reflects a change in effective diameter as the cable is being wrapped/unwrapped thereover providing a different moment arm in the rotation of the drum which must be compensated for in the hydraulic control device both when taking cable up and paying cable out.

Various attempts in the prior art have been chronicled which purport to address themselves to one or a plurality of the above noted problems in designing a pulling mechanism and attempts in the known prior art have taken the following courses: the design of two distinct machines to effect pulling from an overhead or an underground environment; the provision of a friction disc to control the winding and unwinding rate and tension of cable upon an associated drum, and various instrumentalities to override the effect of cable binding, build-up or dissipation on an associated drum which in and of itself alters the moment arm and pull rate, the effect of which has been offset in the past by pressure relief solenoid control valves or clutch mechanisms.

The following citations reflect the state of the art of which applicant is aware insofar as they appear to be germane to the process at hand. U.S. Pat. Nos. 3,226,088, Habighorst, Dec. 28, 1965; 3,448,962, Miller, June 10, 1969; 3,544,070, Blume, Dec. 1, 1970; 3,968,952, Newell, July 13, 1976; and 4.026,483, Skalleberg, May 31, 1977.

Publications Holan Brochure-page G-9 Braden Constant Load Winch Brochure-page 11-7294-1 Gear Products Inc. Brochure- "Planetary Winch" Morse -Page A-180 "Torque Limiter"

The Holan swivel sheave provides a support structure adapted to be disposed upon the trailing portion of a vehicle bed that includes an upwardly extending swivel and housing having a plurality of ball bearings interposed therebetween and an outwardly extending pulley sheave in which a sheave support arm is capable of articulation within a 360° range so that cable can address a winding drum from a substantially constant direction. It should be clear that the outwardly extending support arm provides a bending moment on the swivel housing support and ball bearing structure fastened to the trailing portion of the truck bed and provides a pressure gradient on the ball bearings as well as providing other difficulties. More specifically, most cable pulling apparatus include a hook integrally formed with the associated cable which must be passed over the rotatable sheave and the Holan sheave requires removal of the hook assembly from the cable to allow the cable to be threaded over the sheave in contrast to the instant invention. That is to say, the instant invention distinguishes itself over this known prior art in its ability to provide a swivel support which is readily disassociated from its associated mounting bracket whereby a cable and its associated hooked end can be looped over the swivel sheave without removal of the hook from the associated cable and that there is a beneficial force distribution. Moreover, Holan's required small diameter sheave and its associated severe curvature will deformably and permanently stretch outer strands of the cable during typical loads so that the cable will no longer be straight but will be coiled like a spring.

The Braden publication provides a winch adapted to operate under a constant load environment and requires the use of a friction clutch to act as a drum brake for providing the constant load necessary in pulling endeavors of this sort. A cable path is provided which attempts to negate the effect of cable build-up on an associated drum, and as shown in FIG. 3 of the publication, an operator is required to attend the friction drive portion of the storage drum to alter the change in pulling forces as a function of cable build-up, cable pay out, or wear in the friction clutch assembly, resulting in a somewhat labor intensive product.

The instant invention is distinguished over the known prior art in that hydraulic relief is provided in such a manner that compensation for cable winding build-up is automatically offset not only when the cable is being wound on a drum, but also when it is being unwound so that the hydraulic valve arrangement provides an automatic resistance of braking effect when paying out cable. It is of utmost importance that the winding rate be constant and that the force exerted through the cable be constant so that inordinate pay out or take up rates do not occur.

The patent to Habighorst teaches the use of pulling cable through an underground conduit; the patent to Skalleberg provides an overhead support similar to Habighorst and the remaining citations show the state of the art further and are believed to diverge even more than that which is defined as the invention in the instant application.

The Gear Products winch constitutes a component which, when modified in a novel manner, evolves into applicant's bull wheel.

OBJECTS AND SUMMARY OF THE INVENTION

Accordingly, this invention has as an objective the provision of an improved cable pulling device when contrasted with known prior art instrumentalities.

It is a further object of this invention to provide a device as characterized above in which a cable pulling sheave is adapted to be placed on a trailing portion of a vehicle or adjacent a manhole or in any environment to facilitate the pulling of cable.

It is a further object of this invention to provide a device as characterized above in which the cable pulling device is readily disassociated from its associated environment for storage or re-orientation.

It is further object of this invention to provide a device as characterized above in which an associated hook commonly attached and integrally formed with a cable at one end thereof can be placed through the cable pulling sheave without disassociation of the cable hook from its associated cable.

It is a further object of this invention to provide a device as characterized above in which the sheave can be oriented into a plurality of directions within a 360° plane and held there so as to accommodate different pulling angles.

It is a further object of this invention to provide a device as characterized above in which the cable is directed to a winding drum in a constant controlled manner so that no pulling forces other than that which is encountered by pulling the cable in and of itself will be manifested on associated sensors that monitor the amount of force associated with the pulling.

It is a further object of this invention to provide a device as characterized above in which the amount of cable paid out and taken in can be monitored continuously.

It is a further object of this invention to provide a device as characterized above in which compensation for the amount of cable disposed upon the drum is automatically calibrated and compensated to alter the hydraulic pressure of the fluid associated in the hydraulic system so that a constant pulling load can be afforded.

It is a further object of this invention to provide a device as characterized above in which the hydraulic system associated with the instant application provides tension on the cable when the reel is paying out cable whereby the reel acts as a pump and prevents overwinding of the reel and overpaying of the cable.

These and other objects will be made manifest when considering the following detailed specification when taken in conjunction with the appended drawing figures.

BRIEF DESCRIPTION OF THE DRAWINGS

FIG. 5 is an exploded parts view of FIGS. 2–4.
FIG. 5A cuts away a portion of FIG. 5.
FIG. 8 is the fluid circuitry for the apparatus.

BRIEF DESCRIPTION OF THE PREFERRED EMBODIMENT

Figure 1:
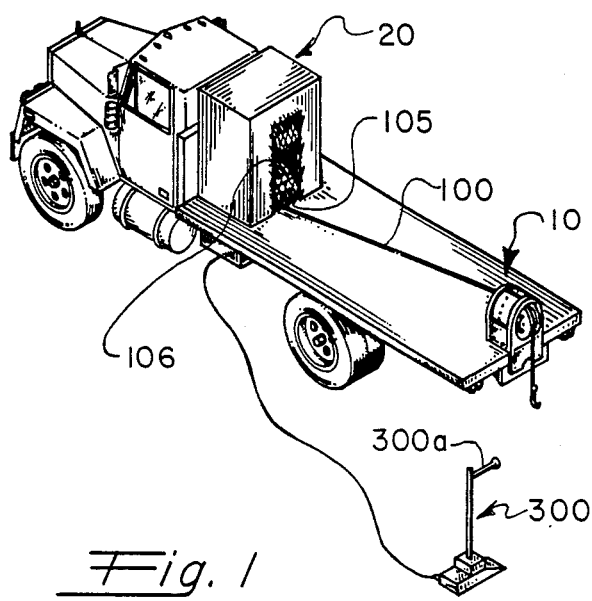
FIG. 1 is a perspective of the apparatus in situ.
Figure 2:
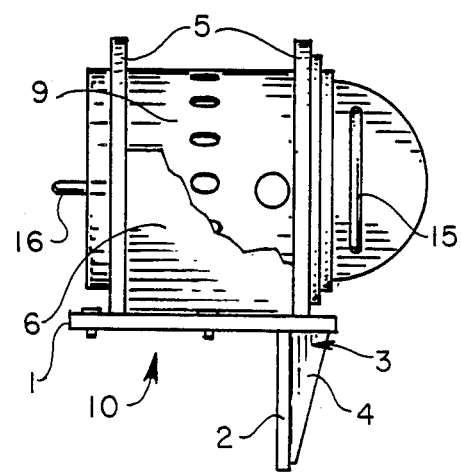
FIG. 2 is a side view of the swivel fairlead at one end of a truck.
Figure 4:
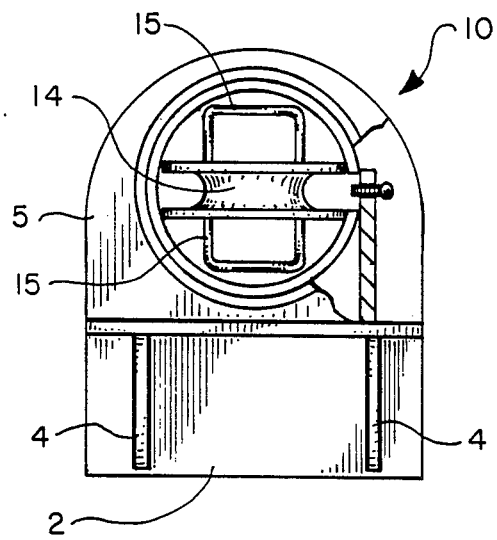
FIG. 4 is an end view of FIG. 2 and FIG. 3.
Figure 3:
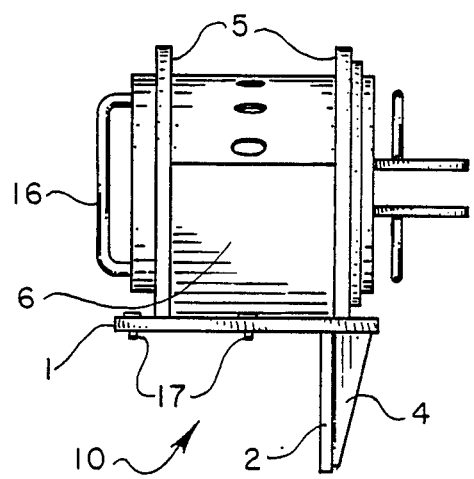
FIG. 3 is a side view similar to FIG. 2 with the fairlead of FIG. 1 rotated.
Figure 6:
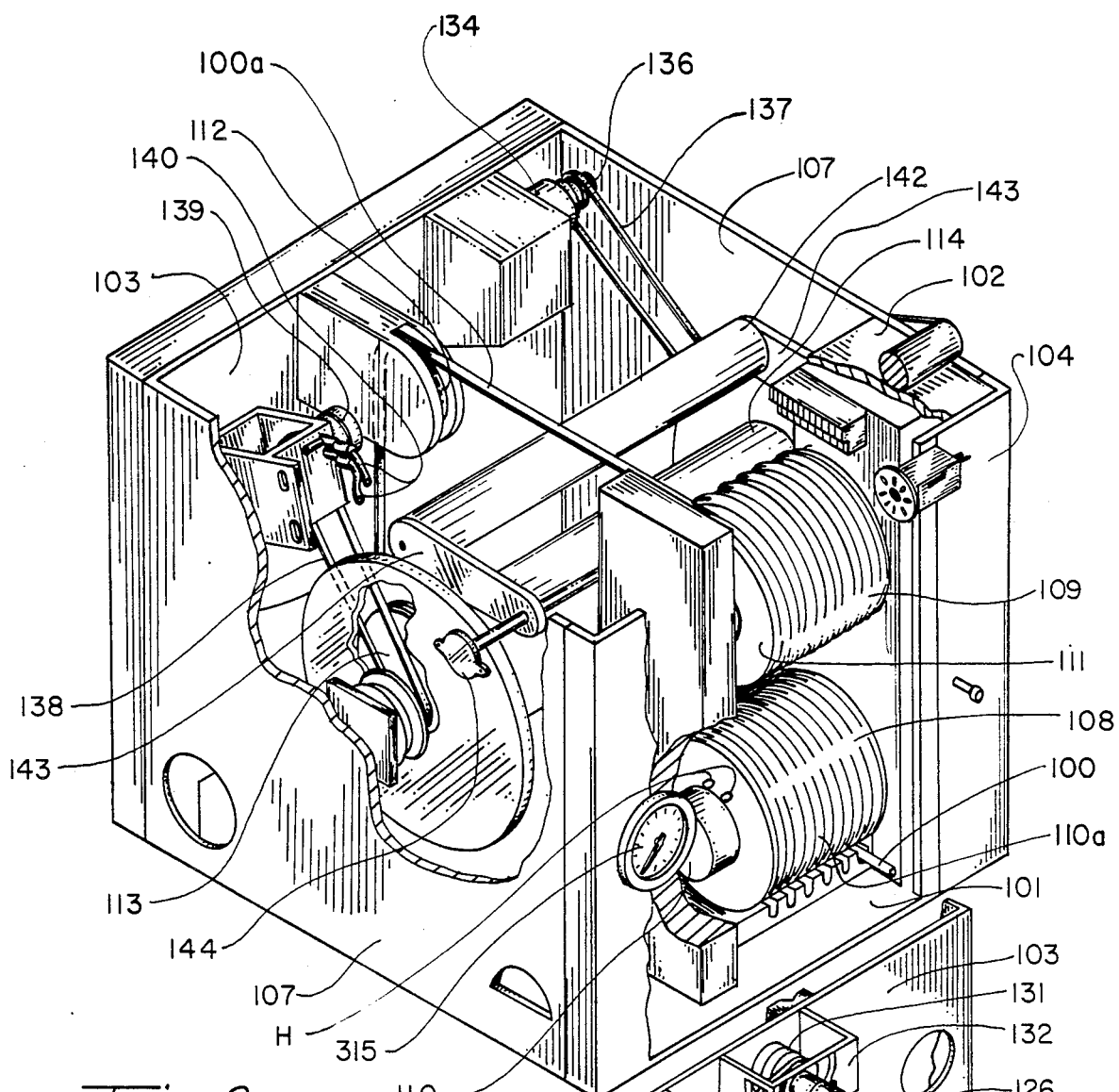
FIG. 6 is a forward perspective of the pulling winch.
Figure 7:
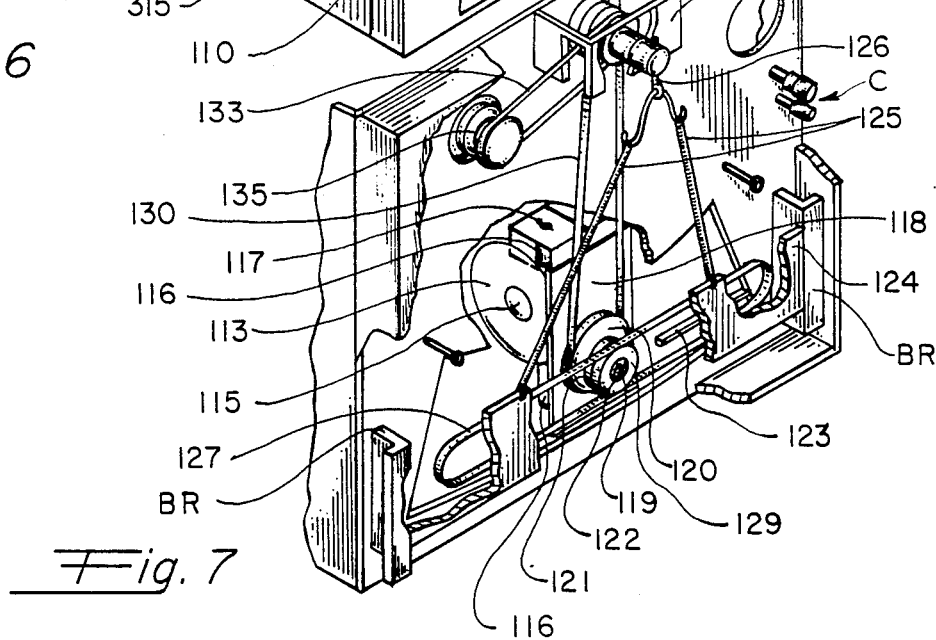
FIG. 7 is a rear perspective of FIG. 6.

Referring to the drawings, wherein like reference numerals refer to like parts throughout the various drawing figures, reference numeral 10 is directed to the swivel fairlead according to the present invention, and reference numeral 20 is directed to the winch assembly associated therewith.

More particularly, the swivel fairlead 10 includes a horizontal support base 1 which in a preferred form is provided with an overhanding portion 3 adapted to have on an undersurface of the horizontal base a vertically disposed plate 2 depending from the horizontal base and interbraced with the overhanging portion 3 by means of a substantially triangular shaped gusset 4. Thus, when taken in section the horizontal base 1 together with the vertical plate 2 forms an L-shaped structure adapted to nest on a trailing lip of a vehicle bed B. Translation of the base and the associated vertical plate is retarded by a plurality of bolt holes 17 disposed in both the horizontal base plate and the vertical plate 1 and 2 respectively, with bolts passing through the truck bed B so that in use and operation, these bolts are exposed only to a very minor shear loading and the apparatus manifests the ability to be removed for storage or for utilization in a remote site without the need for complex disassembly.

The top surface of horizontal base 1 serves to support first and second vertically extending laterally spaced drum supports 5 which includes substantially cylindrical bores through each of the drum supports in axial alignment relative to the length of the truck bed to support a drum in a manner now to be defined.

More particularly, the first and second drum supports 5 are interconnected by side braces 6 disposed along lower outer edges of the drum support and tangent the horizontal base 1 so as to provide a rigid structure, and at least one of the side braces 6 is provided with an upwardly extending tang 7 including a hole for the removable reception therein of a locking pin 8. The locking pin 8 cooperates with a drum 9 having a plurality of holes disposed around its periphery along a circular cross-section thereof to retain the drum in a fixed position for purposes to be assigned shortly.

As shown, the drum 9 is cylindrical in configuration having an end wall 29 provided with a recess 30 which is axially aligned with a longitudinal drum slit 11 disposed on an outer face of the drum disposed in registry with a pulley sheave 14. More particularly, the drum 9 supports by welding first and second pulley sheave plates 12. An appropriate sheave support axle 13 carried on the first and second pulley sheave plates 12 through a bushing supports the pulley sheave 14. The pulley sheave 14 therefor is capable of rotation so that a cable looped over the pulley sheave has adequate clearance along the longitudinal drum slit 11 and out through the recess 30 on the end wall of the drum to communicate with the winch assembly 20. Outer faces of the first and second pulley sheave plates 12 support first and second handles 15 so that once the locking pin 8 has been removed from registry with the holes disposed on the drum, the drum can be oriented in any of 360° (within the design limits of the hole spacing on the drum) to angularly orient the pulley sheave in a plurality of planes and deliver cable to the winch from a substantially constant one direction. The end wall 29 of the drum is provided with a further rear handle 16 as shown in the drawings so that removal of the locking pin 8 not only allows rotation of the drum about its longitudinal axis but also allows extraction of the drum from the first and second drum supports 5. Thus cables having hooked ends can pass through the first and second drum supports without having to disassociate the hooked end from the cable. Only applicant's pulley sheave meets the job environment requirements of a large sheave diameter to cable diameter ratio which minimizes cable distortion, unlike the prior art such as Holan.

More particularly, the longitudinal drum slit 11 in cooperation with the recess on the end wall 29 of the drum and the clearance of the first and second drum supports 5 allows a cable with an associated hook to be passed therethrough, looped over the pulley sheave 14 with sufficient cable slack allowing its disposition within the slit 11 of the drum. The drum can be reinserted back into the first and second drum supports and angularly oriented and locked in place by means of a locking pin 8. Any of a plurality of attitudes of the sheave can be effected whether for pulling the cable from an underground area, from an overhead area or other angle of attack. Given the extreme simplicity with which this swivel fairlead is attached to the trailing portion of a truck bed, it is readily disassociated from the truck bed and can be placed adjacent a manhole or other area to assist in manipulation of cable.

The swivel fairlead communicates operatively with an associated drive mechanism that includes a winch having the following characteristics.

The level wind to be described constitutes an automatic winch which is operatively conditioned by hydraulic flow from associated pumps. The speed and pull can be varied by either a remote foot and/or hand control which can be remote from the main hydraulic servo-mehanism by means of a twenty-five foot hydraulic or air hose for remote stopping and starting, forward and reverse operation. A pulling gauge indicates the pounds of pull which the hydraulic apparatus undergoes in deploying the cable and a footage counter indicates the feet of cable pulled so that should an obstruction or an impediment to the cable hauling apparatus occur (frequently the situ of pipe damage), the location of the binding can be pinpointed expeditiously.

In a preferred form of the invention, the line speed for cable deployment can have first and second speeds, the two speeds are effected by providing a hydraulic device operatively conditioned by a two speed hydraulic valve which causes, in the low mode, oil to travel through two motors in parallel, while in the high speed mode, oil travels through both motors in series. The device is protected by a pull limit valve which will stop the mechanism when pull reaches a desired upper limit, the limit being adjustable by means of an adjustable hydraulic relief valve suitably calibrated.

It is well known that in a conventional winch that the storage drum changes in its effective diameter by virtue of the successive wraps or layers of cable disposed thereover, which automatically factors in an additional tension not reflective of the tension on the cable itself but rather changes in effective moment arm. Thus, the instant application addresses itself to diameter buildup on the storage drum and includes a roller carried on a support arm immediately adjacent the storage reel. As the diameter builds up on the storage reel, the roller lifts up and the associated support arm moves therewith, the support arm conditioning a cam which reorients a hydraulic control valve so as to change the hydraulic pressure in the hydraulic drive motor with changing diameter. When cable is paid out from the storage reel, the roller descends in operative communication with the support arm and the corresponding readjustment of the cam and the hydraulic control valve modifies the hydraulic pressure available and delivered by the hydraulic drive motor. It is thus desired to maintain constant the cable tension (200 lbs.) at the storage reel or drum site to keep the cable tight both on the storage reel and on the bull wheel grooves regardless of the amount of cable on the storage reel even when the pull experiences 20,000 lbs. of tension.

Additionally, as the storage reel operates in reverse to pay out cable, the motor is consequently turned in reverse by the reel which causes the motor to perform as a pump whereby the hydraulic oil is still trying to turn the reel to pull cable in so as to provide a braking action which intrinsically prevents reel overwind.

In addition, a swing arm is provided which is driven back and forth by a sprocket which is driven around inside a continuous chain track so configured to put the last wrap of the cable next to a flange on the reel and thereafter the first wrap of the next layer on top of the last wrap. Thus, while the sprocket is making the turn around the enclosed chain track, uniform loading and winding on the storage reel is afforded.

Most particularly, the winch assembly 20 is characterized by a housing which overlies the winch assembly 20, the housing having a bottom support base 101, side walls 107, a rear wall 103, a top wall 102 and a front wall 104. A central portion of the front wall 104 is provided with a grill 106 formed from a matrix defined by a wire mesh and a low opening 105 is provided for the admission of the cable therebeyond. The enclosure therefor defines an interior within which the winch assembly is disposed and the protective covers defining the enclosure are removeable as is required for maintenance, adjustment, etc. Thus, the cable is stored within the winch housing interior and can be either paid out or retracted as is required. It is to be noted that the cable tension external the enclosure can reach limits of up to the twenty thousand pounds of pull for a given cross-section and accordingly, a pair of first and second bull wheels 108 and 109 are provided to reduce the effective cable tension once within the enclosure. While a specific example delineates the bull wheels within the same enclosure as the storage reel, the bull wheels can be remote therefrom (as adjacent a front bumper of the vehicle) with suitable sheaves redirecting the cable to the storage drum. Also the bull wheels, storage drum, etc. can be oriented in horizontal, vertical or other planes as is required by job considerations.

More particularly, the bull wheels 108 and 109 are formed from a conventional winch made by Gear Products having a central cylindrical core 110 which has been modified as follows. Outer circular end faces of the winch core 110 are tapped along a periphery thereof and provided with bolt holes H which are adapted to receive disc shaped flange plates 111 having an upwardly extending peripheral lip. When one flange plate is removed various annular bull rings 110A can be placed on the core 110 . Each bull ring 110A includes a plurality of grooves on its outer face having a tractive surface. Different respective bull rings are adapted to receive cable having a diameter matched with the diameter of the bull ring grooves. The cable 100 is looped between the two bull wheels in a series of figure eights as shown in the drawings so that mechanical advantage is provided by the plurality of figure eight loops. The cable 100 is ultimately delivered substantially horizontally from the uppermost bull wheel 109 with a substantial reduction in the tension compared with the cable when it is outboard the enclosure. Typically, the cable at 100a is under two hundred pounds of tension so that a reduction in tension of the cable between cable 100a and at the exterior of the enclosure is 100 to 1. Additionally, cable ranging for example from three-eighths of an inch on up to five-eighths of an inch (and up to three-fourths for rope) can be accommodated by merely removing the end flange plate 111 of each of the bull wheels by the removal of the bolts, sliding the bull wheel rings 110A off from the which core 110 and replacing it with a ring 110A having grooves thereon of a different diameter corresponding to the new cable diameter.

The cable at 100a communicates with a centrally disposed pulley sheave 112 carried at the intersection of the top and rear covers, the sheave 112 serving to change the direction of the cable 100a from a substantially horizontal plane to a vertical plane adjacent to the rear cover 103. Thereafter, the cable engages a further sheave 113 of special configuration which constitutes a portion of the level wind, the sheave 113 redirecting the cable onto an associated storage reel 114 carried on a suitable spindle and bearings between the side walls. Since all walls of the enclosure save the bottom are removable, a supporting framework carries all panels and rotatable spindles.

The sheave 113 is carried in a support bracket 115 in a rotatable manner, the bracket in turn is supported by a roll pin 116 in turn carried in a second bracket 117 so that the sheave 113 can rotate about the roll pin 116 in a limited manner. The roll pin bracket 117 in turn has a rearwardly disposed C-shaped support 118 having at a rearward face thereof a bearing supporting a spindle 119 emanating outwardly therefrom upon which is rotatably disposed a first sprocket 120, a roller spacer 121, a guide pin 122, and a second sprocket 129 whose functions will now be defined.

The pin 122 contacts a pin guide 123 carried on a plate 124 which is capable of translation from one horizontal elevation to another within vertical brackets BR at lateral edges thereof and by its resilient support via springs 125 emanating from a central point 126 on a top back face of the frame within the rear cover 103. Affixed to the plate 124 and meshing with sprocket 129 is a chain 127 formed as a closed loop in a substantially oval configuration surrounding the elongate pin guide 123. The chain has first and second horizontal linear sections and arcuate, constant radius end sections. Thus, the sprocket 129 can be caused to travel about and within the oval chain 127 and since the plate 124 is resiliently suspended by springs 125 and constrained by brackets BR, the oscillation of the sprocket 129 to and from in a lateral motion from side to side causes the plate 124 to move from one horizontal position to another when the sprocket 129 is at the curved end portions of the chain with the sprocket 129 riding within the chain 127 and about the pin guide 123. Thus, in this manner when sprocket 120 is driven, rotation of the second sprocket 129 causes the supported pulley sheave 113 to translate laterally from one side wall to another and provide uniform wrapping or winding of the cable on the spool 114. As shown in the drawings, the sprocket 120 is driven by a chain 130 from an uppermost location to be defined.

Figure 9:
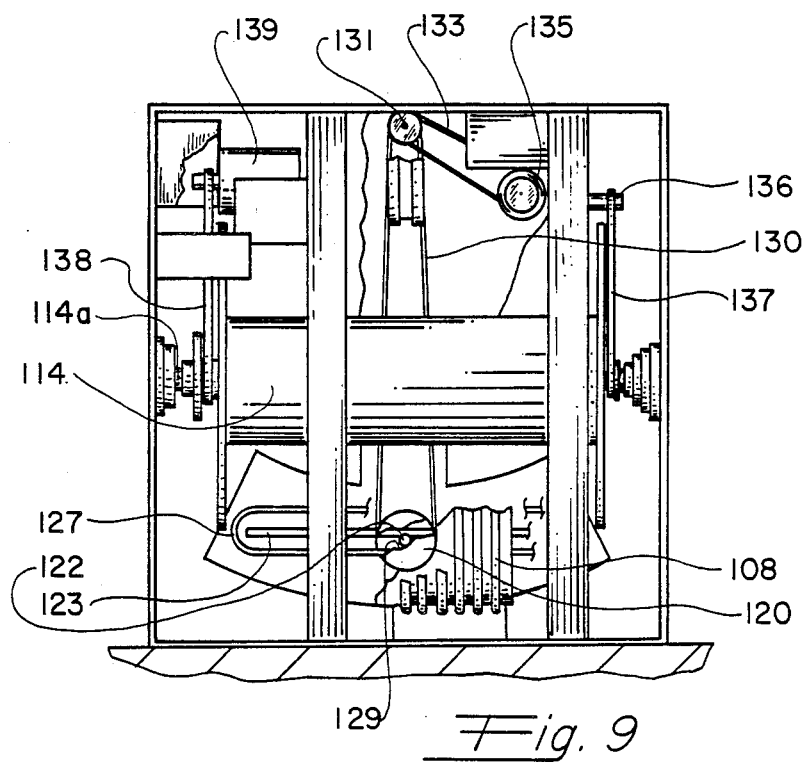
FIG. 9 is a partial front view of FIG. 6 with the bull wheels removed.
Figure 10:
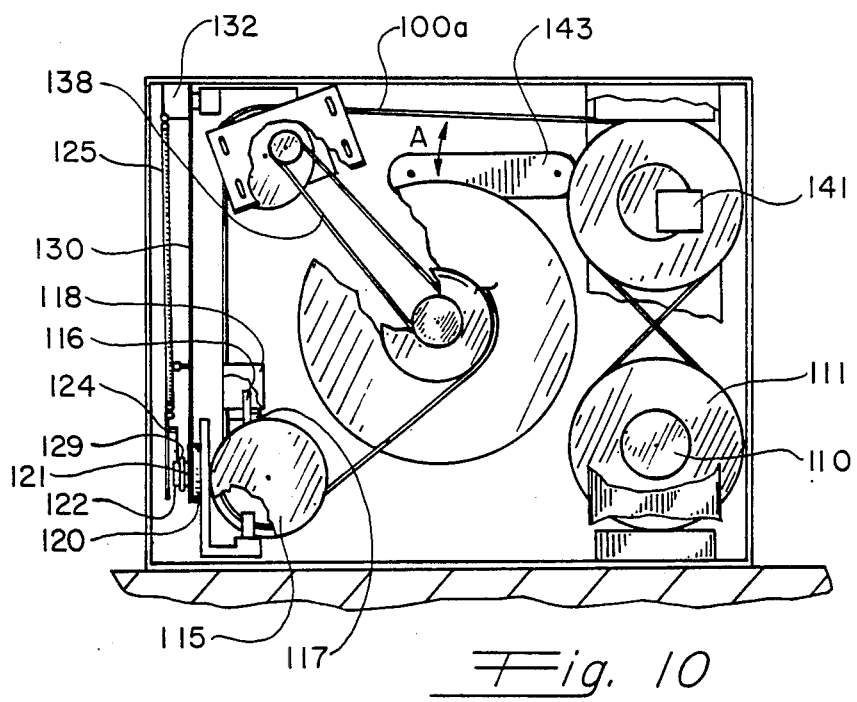
FIG. 10 is a partial side view taken from the left side of FIG. 9.

As shown, the uppermost extremity of chain 130 communicates with a sprocket assembly 131 rotatably supported on a support bracket 132 and is freely rotatable therewith. The sprocket assembly 131 includes two sets of sprocket teeth and a second chain 133 driven by a further sprocket 135 coupled to a right angle convertor and torque limiter 134. The torque limiter 134 available by Morse and described in U.S. Pat. No. 3,447,342 includes a special clutch mechanism which can be selectively engaged or disengaged by turning a bolt 136 altering the friction and spacing between adjacent clutch plates (not shown) within the unit 134, to reorient (by disengagement) the placement of the level wind sheave 113 relative to the associated reel 114 for initial adjustment as when changing cables. The "torque limiter" 134 in turn is connected via a chain 137 (FIG. 9) another sprocket which is disposed on the spindle of the reel 114. Thus, rotation of the reel 114 causes motion of chain 137 and therefor rotation of the sprocket 135 associated with the torque limiter 134. Selective disengagement of the torque limiter allows for orientation of the level wind associated with sprocket 113 as should now be evident. The spindle 114a associated with the reel 114 is in turn driven by a further chain 138 carried on a side of the spindle opposite chain 137 and cooperates with a hydraulic reel motor 139 conditioned by hydraulic lines 140 to a suitable source of hydraulic pressure. The reel motor 139 therefor drives the reel 114 which in turn drives the torque limiter 134, and is coupled to the level wind 113 to assure synchronization of the level wind 113 with the reel 114 to provide uniform cable wrapping on the reel itself. It is important to note that having the sprocket 129 riding within the periphery of the chain 127 causes only two wraps of the cable to occur at the extremities of the reel so that the cable is wrapped uniformly on the reel at all times, and concomitant slowing of the reel rotation rate automatically effects the winding operation.

Each of the bull wheels 108, 109 is operatively conditioned by its own hydraulic motor 141 and coupled to each other with appropriate valving to be discussed, so that the motors may be harnessed in series or in parallel to alter the speed of the bull wheels for a given pulling condition and cable take up rate. Since the bull wheels ultimately determine the cable pay-out or pay-in rate, the reel motor 139 is conditioned thereby in a manner to be defined, but it is to be noted that in the pay out mode, the reel motor 139 acts as a pump providing resistence on the reel so that overwinding of the reel 114x cannot occur since there is an internal resistance of the reel motor 139 in reverse to provide a back pressure keeping appropriate tension on the reel 114 and cable at all times.

More particularly, the reel motor 139 is influenced by the degree of cable build up past the bull wheels in the following manner. A roller 142 is supported on a pair of swing arms 143 in rotatable relation and tangent to the cable placed on the reel 114 at any moment. Rotation of the roller 142 and motion of the roller through the support arm 143 in the direction of the arrows A therefor correlates directly to the amount of cable on the reel and its build-up rate. An end of the support arms 143 remote from the roller 142 operatively conditions a cam 144 connected to a fluidic restrictive valve that alters the rate of winding for the motor 139. Thus, the motor 139 is directly responsive to the amount of cable on the reel 114 and therefore its rate of build-up.

The foregoing winding and reeling apparatus and associated pulley sheave derive its power from a hydraulic pump commonly found on many industrial and commercial vehicles. As should be evident, a control system for use with the hydraulic winding and reeling apparatus assures the reliable utilization of the device, and the schematic associated therewith is shown in FIG. 8. A hydraulic and pneumatic coupling C is provided on the back face of the winch assembly 20, and allows to have tapped therein a servo-mechanism utilizing a pneumatic control and associated solenoid for directing the passage of hydraulic fluid into the winch assembly. Various valving is of course associated with the hydraulic lines to prevent overloading, diverting fluids as is required, etc. The following description relates to the major aspects of the hydraulic-pneumatic control mechanism.

Figure 8A:
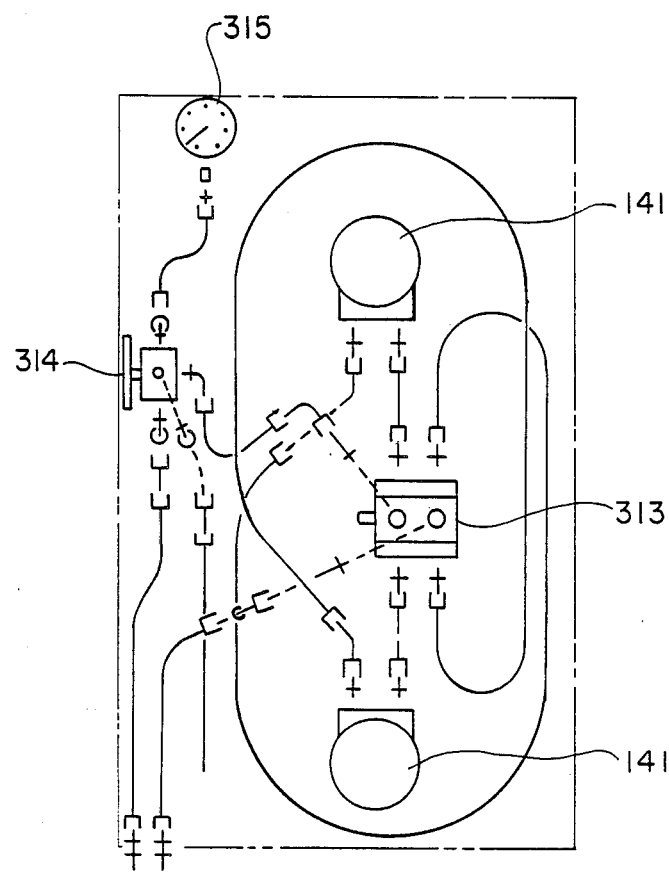
FIG. 8A shows the bull wheel fluid circuit in greater detail.
Figure 8B:
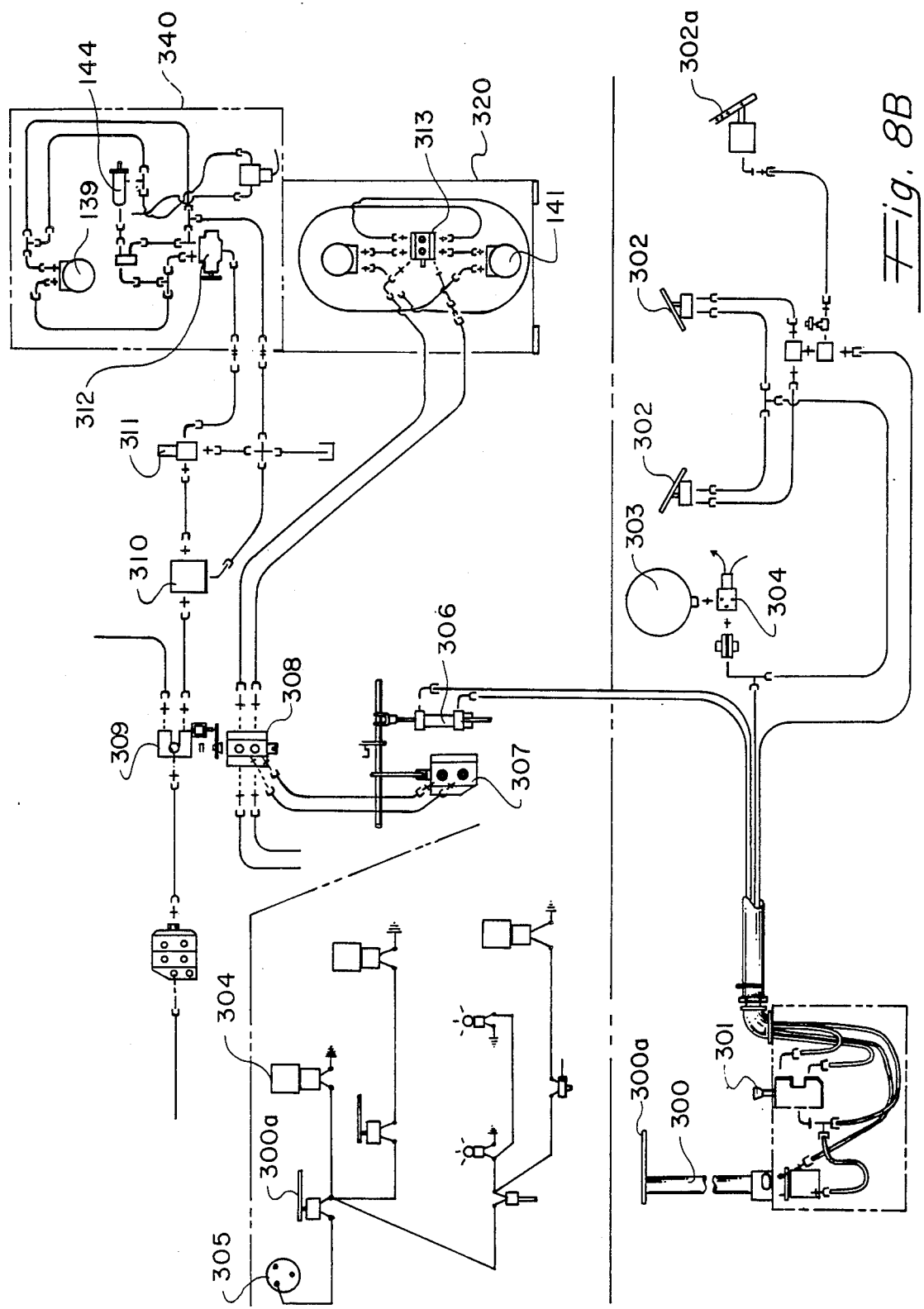
FIG. 8B is an inset showing a bottom portion of FIG. 8 in greater detail.

More particularly, the drawing FIGS. 8, 8A and 8B reflect the remote control unit 300 shown in FIG. 1 and includes a throttle 300a which controls the rate of fluidic passage and therefor the speed at which cable is paid up or taken out. Additionally, while the hand lever type throttle 300a has been provided, a foot operated treadle valve 302 is jointly connected to the same pneumatic circuitry so that one's hands may be free if necessary. In addition, an appropriate valve 301 is provided to control forward and reverse operation for respectively paying up and taking out cable and effectively reverses the flow in the circuit. More particularly, a source of pneumatic pressure such as an air tank 303 provides air to both the hand throttle 300a and the treadle valve 302. An associated electrical solenoid 304 (FIGS. 8 and 8B) is coupled to a source of power 305 sensitive to the throttle 300a or its equivalent to allow passage of the air by conditioning the valves 304 in an appropriate manner. Air exiting either throttle control 300a or 302 passes to the forward reverse switch 301 and ultimately conditions an air cylinder 306 that controls the flow of the hydraulic fluid at hydraulic valve 307. As is shown, the console winch valve 307 enables a double selector valve 308 to ultimately provide fluid to both the bull wheel drive 320 and the cable reel drive 340. More particularly, the double selector valve 308 diverts the hydraulic fluid commonly found on trucks having an overhead boom winch and a cable therewith and when coupled with a single selector relief valve 309, allows hydraulic fluid to go to both the bull wheel drive 320 and/or the cable reel drive 340. The relief valve 309 delivers fluid to a branch flow divider 310 and thence to the cable reel drive 340 and includes a three way solenoid valve 311 which assures that the system will not be enabled should there be a lack of hydraulic fluid. In turn, the solenoid valve 311 allows communication to the flow valve 312 which operates the reel motor 139 discussed hereinabove. The cam control 144 operates as conditioned by the roller 142, and a pressure relief valve communicates with the cable reel drive as a safety factor to avoid undue pressure.

The bull wheel drive system 320 (FIG. 8A) is shown as including the shift valve 313 which changes the flow of the hydraulic fluid from series to parallel and vice-versa to each of the bull wheel drive motors 141 for the attendant purposes. Fluid coming into this aspect of the system first encounters a pull limit valve 314 having an associated pressure gauge 315 mounted on the front face 104 of the winch assembly 20 and can divert fluid from the bull drive motors in the presence of excessive pressure.

The treadle valve 302 cooperates with a throttle positioner 302a which is taken off of the vehicle's motor so that unwanted utilization of the motor from within the cab of the vehicle may or may not have a role in the functioning of the system described hereinabove. As shown as an inset of the FIG. 8 schematic, the not opened switches 300a condition the three way valves and a two way solenoid valve which are safety instrumentalities to assure the appropriate presence of fluidic substance within the lines for the associated purposes and benefits. The system is further protected by an on-off switch of the selector valve, a pair of indicator lights to show the device as being operational and a not opened pressure switch in the air throttle line which closes at a certain pressure to enable the system.

Having thus described the preferred embodiment of the invention, it should be understood that numerous structural modifications and adaptations may be resorted to without departing from the spirit of the invention.

What is claimed is:

1. A device for paying-out and taking-up cable comprising in combination:
   a pair of bull wheels adapted to receive cable and pay cable out including a plurality of wraps of cable looped in a figure eight configuration over both bull wheels so as to gain mechanical advantage thereby,
   storage means associated with said bull wheels, means for winding cable onto said storage means,
   and means for synchronizing rotation rate between said bull wheels and said storage means so that cable wrapped on said storage means is put on or taken off in a uniform manner, wherein said means for winding cable on said storage means includes a sheave disposed adjacent said storage means, means for causing said sheave to move along said storage means in an oscillatory pattern so as to uniformly distribute cable along the length of said storage means, said sheave provided with means to synchronize the oscillatory pattern with said storage means' rotation rate, and a constraint to assure that only one wrap of cable at a time is placed on said storage means along its storage length except at end portions when said sheave changes direction in its oscillatory pattern where two wraps are placed thereon, said constraint including a chain welded to a support plate having a central guide bar, said chain disposed in an oval manner about said guide bar, a sprocket from said sheave oriented to engage said chain on an inner path thereof whereby when said sprocket engages arcuate sections of said chain on an inner portion thereof only two wraps of cable will be placed on each end of said storage means and said support plate is resiliently carried and constrained by brackets so as to allow vertical motion thereof in response to said sprocket engaging arcuate sections of said chain, said oval chain including first and second horizontally extending linear portions and arcuate end walls.

2. The device of claim 1 wherein a further sprocket is interposed between said sheave and said first named sprocket, chain means for drivingly engaging said further sprocket through a mechanical linkage with said storage means for synchronization.

3. The device of claim 2 including a torque converter interposed in said mechanical linkage for reorienting said sheave with respect to to said storage means.

4. The device of claim 3 including a means for gauging the amount of cable placed on said storage means reflecting an increasing or decreasing diameter on said storage means, said gauging means, in turn, affecting a hydraulic circuit associated with said storage means to effect its rotation rate in response to cable build-up for synchronization with said bull wheels to thereby alter rotation rate of said storage means relative to said bull wheels.

5. A device for paying-out and taking-up cable comprising in combination:
   a pair of bull wheels adapted to receive cable and pay cable out including a plurality of wraps of cable looped in a figure eight configuration over both bull wheels so as to gain mechanical advantage thereby,
   storage means associated with said bull wheels, means for winding cable onto said storage means, and means for synchronizing rotation rate between said bull and said storage means so that cable wrapped on said storage means is put on and taken off in a uniform manner, each of said bull wheels is formed from a winch core having tapped holes on end walls of said core, a removeable sleeve for each core having grooves on an outer face thereof corresponding to the diameter of the cable, and flange walls on said end walls, bolted thereto constraining said sleeves, a hydraulic circuit having a first branch and a second branch;

remote control means for operatively conditioning said first branch and said second branch of said hydraulic circuit, wherein said first branch of said hydraulic circuit operates to condition said pair of bull wheels in synchrony and includes means for converting motion of said pair of bull wheels from a first speed to a second speed and further includes a branch flow divider to effect reorientation of hydraulic fluid flowing therethrough from series relationshp to a parallel relationship;

wherein said second branch of said hydraulic circuit is provided with means for driving said storage means in operative association with said pair of bull wheels; and further comprising means for altering the rate of rotation of said storage means and including a damping valve in said second branch so that pay-out or take-up of cable on said storage means reflects change in cable build-up of said storage means.

6. In a winch the combination including an instrumentality for paying-in and taking-out cable under tension at all times, a hydraulic circuit associated therewith, a first branch of said hydraulic circuit operating to condition a pair of bull wheels in synchrony including means for converting motion of said two bull wheels from a first speed to a second speed including a branch flow divider to effect reorientation of hydraulic fluid flowing therethrough from a series relationship to a parallel relationship, a second branch of said hydraulic circuit provided with means for driving a storage means in operative association with said bull wheels, means for altering the rate of rotation of said storage means including a damping valve in said storage means second branch so that pay-out or take-up of cable on said storage means will reflect change in cable build-up of said storage means, remote control means for operatively conditioning said storage means hydraulic circuit and said bull wheel hydraulic circuit, and said bull wheels are each formed from a winch core, tapped holes on end walls of said core, a removeable sleeve for each core having grooves on an outer face thereof corresponding to diameter of cable, and flange walls on said end walls, bolted thereto constraining said sleeve.

7. A device for paying-out and taking-up cable, comprising in combination:

a pair of bull wheels, each of substantially cylindrical configuration and having a plurality of circular grooves circumscribing an outer cylindrical surface thereof, with each said groove spaced from an adjacent groove along the length of said cylindrical surface, the depth of each said groove corresponding substantially to the diameter of the cable, said pair of bull wheels receiving a plurality of cable wraps looped over all said grooves of both bull wheels in a figure eight configuration for mechanical advantage, means for driving said bull wheels to pay-out and take-up the cable, means for storing the cable in communication with said bull wheels, said means for storing the cable including a storage reel and a sheave which oscillates along the length of said reel, feeding cable evenly thereon, an oval chain fixed to a support plate, said support plate being resiliently suspended to allow motion of said chain between one of two horizontal elevations; and means for causing said sheave to travel along said chain, causing said sheave to oscillate.

8. The device of claim 7 wherein said bull wheels are each formed from a winch core having tapped holes on end walls thereof, a removeable sleeve for each said core having said grooves thereon, and flange walls bolted onto said core and walls to retain said sleeve on said core yet allow rapid sleeve replacement so that the depth of said sleeve grooves matches the cable diameter.

9. An apparatus for winding cable on a storage reel comprising, in combination:

a sheave;

means for causing said sheave to move along said storage reel in an oscillatory pendulum type motion so as to uniformly distribute cable along the length of said storage reel, said sheave being provided with means to synchronize the oscillatory motion with the rotation rate of said storage reel;

a constraint operatively conditioning said sheave to assure that only one wrap of cable is placed on said storage reel except at end portions thereof when said sheave changes direction where two wraps are placed thereon, said constraint including a chain welded to a support plate having a central guide bar and said chain being disposed in an oval manner about said guide bar; and a sprocket attached to a sheave support oriented to engage said chain on an inner path thereof whereby when said sprocket engages arcuate sections of said chain on an inner portion thereof two wraps of cable will be placed on each end of said storage reel, said support plate being resiliently carried from a support frame and constrained by brackets so as to allow vertical motion thereof in response to said sprocket engaging arcuate sections of said chain and the oval chain including first and second horizontally extending linear portions and arcuate end portions.

* * * * *